(12) United States Patent
Klug et al.

(10) Patent No.: US 7,596,224 B2
(45) Date of Patent: Sep. 29, 2009

(54) METHOD AND SYSTEM FOR SECURE CALL ALERT

(75) Inventors: Keith M. Klug, Mesa, AZ (US); Stuart S. Kreitzer, Coral Springs, FL (US); Fred R. Villa, Gilbert, AZ (US)

(73) Assignee: Motorola, Inc., Schaumburg, IL (US)

( * ) Notice: Subject to any disclaimer, the term of this patent is extended or adjusted under 35 U.S.C. 154(b) by 252 days.

(21) Appl. No.: 11/005,787

(22) Filed: Dec. 7, 2004

(65) Prior Publication Data

US 2006/0123224 A1    Jun. 8, 2006

(51) Int. Cl.
*H04K 1/00* (2006.01)
*H04L 9/00* (2006.01)
*H04B 1/38* (2006.01)

(52) U.S. Cl. .......................... 380/270; 713/171; 726/3; 455/410; 455/567

(58) Field of Classification Search ................ 380/255, 380/270, 257, 259, 277; 713/150, 171; 726/3; 455/410, 456, 567
See application file for complete search history.

(56) References Cited

U.S. PATENT DOCUMENTS

| | | | | |
|---|---|---|---|---|
| 4,555,805 A | * | 11/1985 | Talbot | 380/33 |
| 5,142,577 A | | 8/1992 | Pastor | |
| 5,357,571 A | | 10/1994 | Banwart | |
| 5,390,252 A | | 2/1995 | Suzuki et al. | |
| 5,402,491 A | | 3/1995 | Locascio et al. | |
| 5,420,863 A | * | 5/1995 | Taketsugu et al. | 370/337 |
| 5,434,920 A | * | 7/1995 | Cox et al. | 380/257 |
| 5,559,795 A | | 9/1996 | Ahl | |
| 5,619,572 A | | 4/1997 | Sowa | |
| 5,974,043 A | * | 10/1999 | Solomon | 370/352 |
| 6,044,158 A | * | 3/2000 | Terpening et al. | 380/255 |
| 6,094,429 A | * | 7/2000 | Blanchette et al. | 370/347 |
| 6,212,280 B1 | | 4/2001 | Howard, Jr. et al. | |
| 6,278,697 B1 | | 8/2001 | Brody et al. | |
| 6,445,686 B1 | | 9/2002 | Hoffbeck et al. | |
| 6,580,704 B1 | | 6/2003 | Wellig et al. | |
| 6,611,607 B1 | | 8/2003 | Davis et al. | |
| 6,700,964 B2 | * | 3/2004 | Schmid et al. | 379/189 |

(Continued)

OTHER PUBLICATIONS

Goldberg et al., "Secure Web Server Performance Dramatically Improved by Caching SSL Session Keys," NYU Jun. 23, 1998.

(Continued)

*Primary Examiner*—Minh Dieu Nguyen
(74) *Attorney, Agent, or Firm*—Akerman Senterfitt; Pablo Meles

(57) ABSTRACT

An encryption capable communication device (10) can include a transceiver (38 and 44) and a processor (12) coupled to the transceiver. The processor can be programmed to receive notification of a secure call alert indicative of a desire for secure communications between an alerting device and the encryption capable communication device serving as a recipient device and further cause the recipient device to switch (64) to a secure mode in response to receipt of the notification. The processor can be further programmed to initiate a key exchange (67) between the alerting device and the recipient device if needed and automatically respond (70) to the secure call alert by the recipient device in the secure mode when a user of the recipient device selectively responds to the secure call alert. The processor can also establish a symmetric traffic key during the key exchange using Automatic Public Key exchange techniques.

20 Claims, 4 Drawing Sheets

U.S. PATENT DOCUMENTS

| | | | |
|---|---|---|---|
| 6,879,671 B2* | 4/2005 | Schmid et al. | 379/189 |
| 6,959,184 B1* | 10/2005 | Byers et al. | 455/410 |
| 6,965,674 B2 | 11/2005 | Whelan et al. | |
| 7,003,114 B1 | 2/2006 | Mauro | |
| 7,042,353 B2* | 5/2006 | Stilp | 340/539.22 |
| 7,069,031 B2 | 6/2006 | Maggenti et al. | |
| 2002/0016153 A1* | 2/2002 | Sato et al. | 455/41 |
| 2002/0172364 A1 | 11/2002 | Mauro | |
| 2003/0012149 A1 | 1/2003 | Maggenti et al. | |
| 2004/0068649 A1* | 4/2004 | Haller et al. | 713/153 |
| 2005/0025315 A1 | 2/2005 | Kreitzer | |
| 2005/0129065 A1 | 6/2005 | Loy et al. | |
| 2006/0045136 A1 | 3/2006 | Rainbolt et al. | |
| 2006/0046756 A1* | 3/2006 | Kies | 455/518 |
| 2006/0073795 A1* | 4/2006 | Mayblum et al. | 455/90.2 |
| 2006/0123224 A1 | 6/2006 | Klug et al. | |
| 2006/0269065 A1 | 11/2006 | Lindteigen et al. | |
| 2006/0281480 A1 | 12/2006 | Klug et al. | |

OTHER PUBLICATIONS

Goldberg et al., "Secure Web Server Performance Dramatically Improved by Caching SSL Session Keys". Courant Institute of Mathematical Science, New York University. 8 Pgs.

Rogue Wave Software, Inc., "Secure Communication Module User's Guide", 1 pg. article. http://roguewave.com/support/docs/leif/securityug/5-6.html; Web site last visited Nov. 4, 2003.

Schneier, "Applied Cryptography", John Wiley & Sons, Inc., 2nd Edition, 1996, p. 48.

L3 Communications, "FNBDT Future Narrow Band Digital Terminal - OMNI Secure Terminal"; 2 page article. http://www.1-3com.corn/cs-east/infosec/omni/ie_infosec_omni_fnbdt.html. Web site last visited Feb. 7, 2007.

General Dynamics Communications Systems, "FNBDT Signaling Plan", 213 pages. Sep. 1, 1999.

* cited by examiner

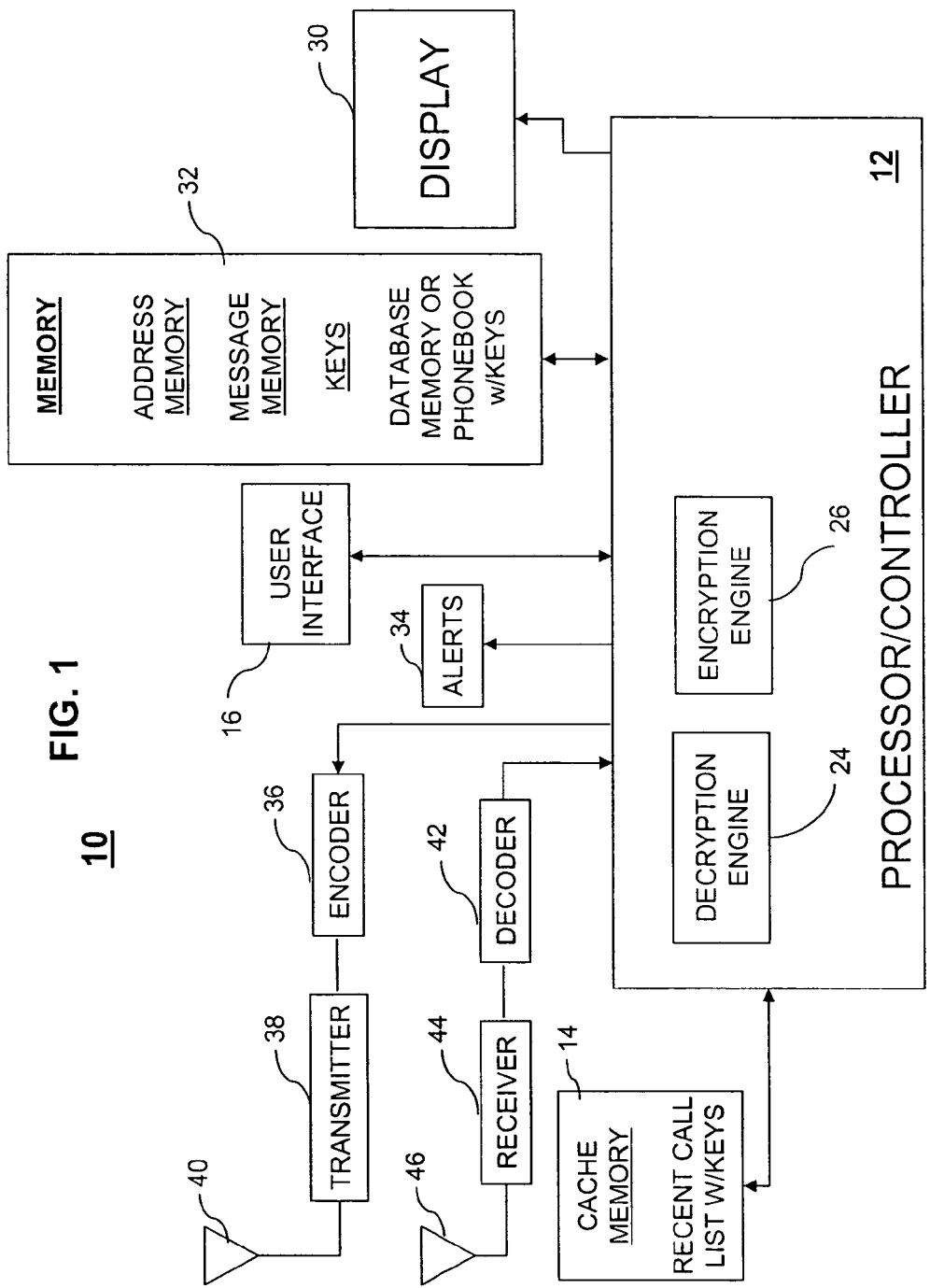

METHOD AND SYSTEM FOR SECURE CALL ALERT

FIELD OF THE INVENTION

This invention relates generally to secure communications, and more particularly to a system and method for establishing secure communications among portable communication devices having multiple modes or during a background mode.

BACKGROUND OF THE INVENTION

Encryption of end-to-end communication is an increasingly important feature, particularly for wireless communication devices such as cellular phones and personal digital assistants (PDAs) to reduce the likelihood of eavesdropping. Encryption can be applied to voice (cellular interconnect or private call dispatch) as well as data. Using voice as an example, encryption algorithms typically employ a secret key that is used to encode voice on the source handset using an encryption algorithm. The coded voice stream can then be transmitted securely over a cellular communication system to a destination or target device. In order to decode the encrypted voice signal, the destination handset must use the same secret key that was used to encrypt the data and apply a decryption algorithm.

A classic problem in cryptography is securely sharing a secret key between two devices that can be miles or thousands of miles apart. Automatic Public Key (APK) exchange techniques are both a secure and convenient way to establish a secret key between two devices without transmitting the secret key in the clear over an insecure link. Diffie-Hellman and Elliptic Curve Cryptography are two well-known public-key algorithms that can be combined with protocols such as FNBDT (Future Narrow Band Digital Terminal) to implement APK systems. Although APK methods are convenient compared with alternatives such as manual key loaders, they are relatively slow as a result of being computationally intensive and because of the large keys needed for good security. To avoid this speed penalty, most secure devices use APK only to establish a symmetric (shared by both sides) traffic key and then revert to fast symmetric-key encryption algorithm such as DES or AES to encrypt and decrypt the traffic.

Because APK exchange is relatively slow on wireless devices, it noticeably delays call setup. Call set-up is the time elapsed between pressing the send or push-to-talk button and the call connecting with a secure traffic channel or a secure voice communication established. Excessive set-up time is particularly harmful to the user experience on dispatch calls which are bursty in nature and are adversely affected by even small set-up delays.

Cryptographic devices characteristically usually require a method of key exchange. Symmetric key systems in particular require the identical key to be present at both the transmitter and receiver. Modern cryptographic systems rely on advanced mathematical techniques to securely share these common keys by performing an exchange of messages between the two users. As noted above, the exchange of messages to obtain common encryption keys can be time consuming for the user to complete.

Modern cellular phones provide reasonably secure communications for most informal conversations and business purposes. However, for highly sensitive communications in areas such as government, legal, and some business applications, additional protection against eavesdropping is sometimes required. Highly secure voice communication on wireless networks typically requires that the conversation be encrypted over the communication link using various techniques, many of which are well known in the art. Furthermore, cryptographic communication devices are typically dual mode devices that are capable of both clear (non-encrypted) and secure (encrypted) communication. Existing dual-mode communication devices in this regard fail to indicate in advance of the communication as to which mode is desired.

Motorola's iDEN technology for example includes a popular feature known as the Call Alert that signals to a recipient or remote user that a private call (PTT) session is being requested. The Call Alert feature allows the remote user to initiate communication immediately or to wait before responding. In current devices, the call alert feature only supports alerting the remote user that a clear call is requested and does not include any type of indication that a secure call is desired. Furthermore, if a secure call is really desired using the existing non-secure alert function, the alert is sent to the remote user. The remote user does not know that the initiator desired a secure dispatch call, and the remote user will likely respond with a clear call. The remote user's response will usually necessitate that the initiator verbally communicate that a secure call is desired in a clear call, terminate the clear call, and then initiate a secure call. The typical sequence is an alert, followed by a clear communication exchange, followed by a secure communication exchange. This scenario is annoying for the user and an inefficient use of system resources when attempting to establish secure communications using a call alert function.

SUMMARY OF THE INVENTION

Embodiments in accordance with the present invention can provide a secure call alert to a remote device or recipient device so that the recipient of the secure call alert can automatically respond back in a secure call or in a secure mode. Furthermore, additional embodiments using communication devices capable of both secure and clear communication can provide an indication to the called party in advance of the communication as to which mode (secure or clear) is desired.

In a first embodiment of the present invention, a method of establishing secure communications between encryption capable communication devices using a secure call alert can include the steps of sending notification by an alerting device to a recipient device of the secure call alert indicative of a desire for secure communications and responsive to receipt of the notification, causing the recipient device to switch to a secure mode. The method can further include the steps of initiating a key exchange between the alerting device and the recipient device if needed and automatically responding to the secure call alert by the recipient device in the secure mode when a user of the recipient device selectively responds to the secure call alert. The key exchange can be done using Automatic Public Key exchange techniques and implemented using public-key algorithms selected from the group of Diffie-Hellman cryptography and Elliptic Curve Cryptography for example. Sending notification can include initiating the secure call alert by activating a key on a user interface on the alerting device and further activating a push-to-talk button on the alerting device. The step of sending notification can involve sending a secure call alert request to a base station, receiving a secure call alert acknowledgement from the base station signifying receipt of the secure call request from the base station and receiving a secure call alert complete message signifying successful delivery of the secure call request to the recipient device. Note, the recipient device can automatically switch between a secure mode and a clear mode depending on a type of call alert received and key exchanges can occur automatically in response to the secure call alert if needed. Further note that presentation of the notification of the secure call alert at the recipient device can be enabled using an embedded control message with the notification of the secure call alert. Optionally, a secure group call can be established among the alerting device and a plurality of recipient devices using a group secure call alert. To avoid additional unnecessary traffic, a predetermined number of symmetric traffic keys can be stored in a cache memory associated a predetermined number of other portable communication devices in recent communication with the alerting device.

In a second embodiment of the present invention, an encryption capable communication device can include a transceiver and a processor coupled to the transceiver. The processor can be programmed to receive notification of a secure call alert indicative of a desire for secure communications between an alerting device and the encryption capable communication device serving as a recipient device and further cause the recipient device to switch to a secure mode in response to receipt of the notification. The processor can be further programmed to initiate a key exchange between the alerting device and the recipient device if needed and automatically respond to the secure call alert by the recipient device in the secure mode when a user of the recipient device selectively responds to the secure call alert. The processor can establish a symmetric traffic key during the key exchange using Automatic Public Key exchange techniques, for example, implementing Future Narrow Band Digital Terminal (FNBDT) protocol combined with public-key algorithms selected from the group of Diffie-Hellman cryptography and Elliptic Curve Cryptography. Note, the encryption capable communication device can further include a display coupled to the processor so that the notification of the secure call alert can be presented upon receipt of the secure call alert.

In a third embodiment of the present invention, a system for efficiently establishing secure communications using a secure call alert can include a first communication device serving as an alerting device communicatively coupled to a base station such that the alerting device can be programmed to user selectively send the secure call alert to at least a second communication device serving as the recipient device. The recipient device can be programmed to ;receive the secure call alert and responsively exchange keys with the alerting device if needed for secure communication and the recipient device can respond to the secure call alert in a secure mode automatically when a user of the recipient device selectively responds to the secure call alert. The alerting device can send the secure call alert to the recipient device by sending a secure call alert request to the base station which sends a secure call alert paging request to the recipient device. The alerting device can further receive a secure call alert request acknowledgment upon the base station acknowledging receipt of the secure call alert request. The alerting device can further receive a secure call alert complete message from base station indicating that the base station has successfully delivered the secure call request to the recipient device and that the recipient device acknowledged receipt. In yet another embodiment, the alerting device can further establish a secure group call by sending a participant list to the base station whereupon the base station sends a group call alert to members in the participant list or in a talkgroup.

Other embodiments, when configured in accordance with the inventive arrangements disclosed herein, can include a system for performing and a machine readable storage for causing a machine to perform the various processes and methods disclosed herein.

BRIEF DESCRIPTION OF THE DRAWINGS

FIG. 1 is a block diagram of a portable communication device in accordance with an embodiment of the present invention.

DETAILED DESCRIPTION OF THE DRAWINGS

Figure 3:
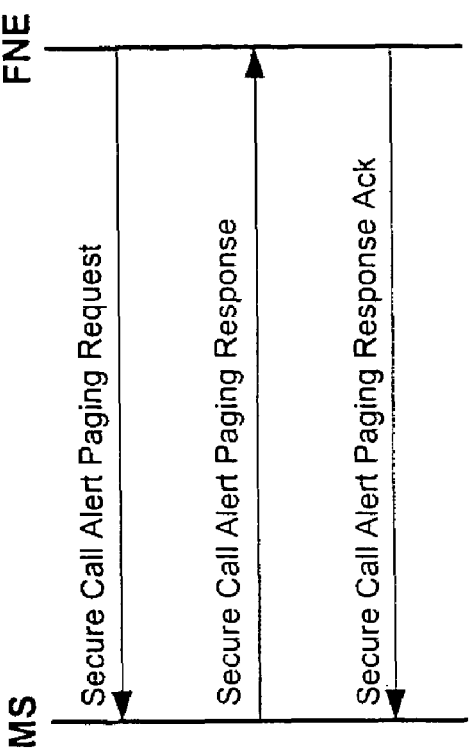
FIG. 3 is a secure call alert process flow between an recipient device and a base station in accordance with an embodiment of the present invention.

While the specification concludes with claims defining the features of embodiments of the invention that are regarded as novel, it is believed that the invention will be better understood from a consideration of the following description in conjunction with the figures, in which like reference numerals are carried forward.

Referring to FIG. 1, block diagram of a portable communication device 10 (such as the alerting device or recipient device described above) capable of sharing keys or establishing keys during a background mode or idle state in accordance with the present invention is shown. The portable communication device 10 can use a form of the existing popular Call Alert feature used with Push-to-talk over cellular (PoC). The existing Call Alert feature is popular because it provides a way to signal the called party that a conversation is desired, and furthermore, the called party can respond back at any time with a single button press, but with a clear (rather than a secure) communication. Because current implementations of the call alert feature were not designed for use with encryption-capable phones, it has not been possible to indicate to the called party that a secure call is being requested by the caller. When the existing call alert is sent to a remote user, the remote user has no indication whether a clear or secure (dispatch or cellular) exchange is being requested. In contrast, embodiments herein can send a secure alert to a remote or recipient device so that the recipient of the alert can automatically respond back in a secure mode without the need for further clear communications to establish the secure communications and a display or other presentation device can optionally provide an indication that secure communication is desired.

Referring once again to FIG. 1, the device 10 can include, for example, a cellular phone, a two-way trunked radio, a combination cellular phone and personal digital assistant, a smart phone, a home cordless phone, a satellite phone, a Motorola iDEN phone, or any device capable of operating in either a clear mode or secure mode in accordance with the present invention. A device capable or operating in either a clear or secure mode can include any number of communication devices able to operate in an interconnect voice mode, a dispatch voice mode, peer-to-peer data mode, a peer-to-peer voice mode, or among different protocol modes such as CDMA, WCDMA, TDMA, GSM, WLAN to name a few. In this particular embodiment, the portable communication device 10 can include an encoder 36, transmitter 38 and antenna 40 for encoding and transmitting information as well as an antenna 46, receiver 44 and decoder 42 for receiving and decoding information sent to the portable communication device 10. The receiver 44 and transmitter 38 can be a transceiver. The device 10 can further include an alert 34, a user interface 16, memory 32 and a display 30. The device 10 can further include a processor or controller 12 coupled to the display 30, the encoder 36, the decoder 42, the alert 34, a cache memory 14 and the memory 32. The memory 32 can include address memory, message memory, memory for keys and memory for database information such as a phonebook that can optionally contain the key related information. Optionally or alternatively, the cache memory 14 can include a recent call list along with associated keys for respective members of the list or lists of talkgroups that include members that can be contacted in a group call. Of course, to provide secure communications, the device 10 can also include a decryption engine 24 to decrypt encrypted information received by the device 10 and an encryption engine 26 to encrypt information sent out by the device 10. The engines 24 and 26 can be embedded in the processor 12 or reside external to the processor 12. Further note that the user interface 16 can include an alert button (either as a mechanical key or a soft key) that enables the call alert function in either a clear or secure mode. In the case of a Motorola iDEN phone or a cellular phone having a PoC feature, the call alert function is sent or transmitted to the target or recipient device by subsequently activating a PTT button which can form a part of the user interface 16 of the device 10. Alternatively, the user interface 16 can provide for a single key that both calls up the clear or secure call alert function and sends the respective call alert to the recipient device(s).

Note, in several embodiments, a secure alert feature can be used to reduce delays (or mitigate the effects of such delays) resulting from key exchange. In this regard, it should be noted that secure calls typically require that a cipher key be present in both the sending and receiving units to permit transparent encryption and decryption of the communication. These keys are usually either pre-placed in the unit or are mathematically generated in a process known as Automatic Public Key (APK) exchange which is well known in the art. APK tends to be the most convenient method of distributing symmetric keys because it does not require manual loading of keys into the handset. However, the disadvantage of APK is an annoying delay before secure communication can start while messages are exchanged between the units during the process of key establishment. Thus, a recipient or target mobile subscriber (MS) device can utilize existing crypto keys or new keys acquired during a background key exchange (during the idle time occurring between receipt by a recipient device of a secure call alert and a user selected response to the secure call alert) to respond back to the alerting or initiating device in a secure mode.

Figure 2:
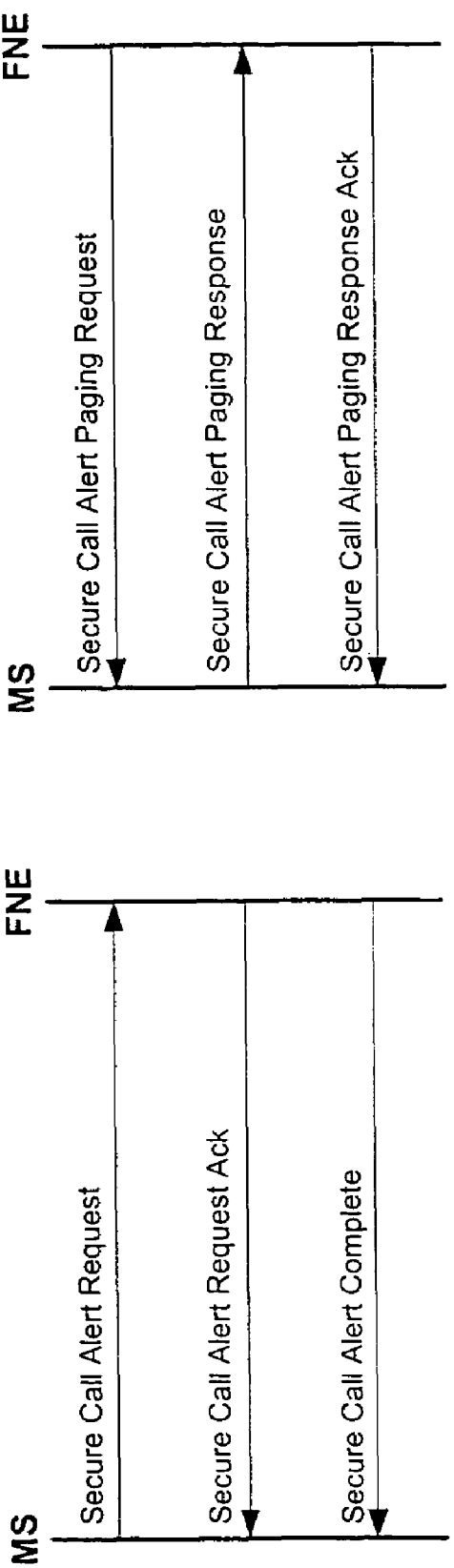
FIG. 2 is a secure call alert process flow between an alerting device and a base station in accordance with an embodiment of the present invention.

As illustrated in FIG. 2, the secure call alert can be initiated by a user by selecting a secure call alert on the User Interface (UI) of a communication device (such as a phone) and optionally pressing a PTT button (although this UI sequence can be implemented in a variety of ways as noted above). The initiation causes the mobile station (MS) serving as the alerting device to send a Secure Call Alert Request message to a base station or infrastructure (also called Fixed Network Equipment (FNE)) requesting a Secure Call Alert. The Secure Call Alert Request message can be sent on a cellular control channel via a method such as a Random Access Channel (RACH) Procedure. The communication of messages using cellular technology is well known. The initiating MS or alerting device can then begin monitoring a control subchannel for a response from the FNE. The FNE can respond immediately by acknowledging the receipt of the Secure Call Alert Request message with a Secure Call Alert Acknowledgement message on a control subchannel. This message tells the initiating MS that the request was received by the FNE. Sometime later, the FNE can respond back to the initiating MS with a Secure Call Alert Complete message which indicates that the FNE has successfully delivered the secure call request to the target MS and the target has acknowledged receipt. Note, if the target MS is not capable of establishing a secure call, or if the key exchange fails, then it should not respond successfully to the FNE request and/or send an error message such as a Secure Call Alert Negative Acknowledgement (Nak).

As illustrated in FIG. 3, the first step in the process for delivering the Secure Call Alert to the recipient device (or target MS) is for the FNE to send a Secure Call Alert Paging Request to the target MS on a paging sub-channel (in a typical implementation). The target MS will respond back immediately with a Secure Call Alert Paging Response to acknowledge the request. The FNE in turn can acknowledge the transmission from the MS by sending a Secure Call Alert Response Echo. The procedure described and illustrated with respect to FIGS. 2 and 3 are sample implementations for a Secure Call Alert feature. In this example, messages are typically sent on a control channel of a cellular system.

Note, it is also possible to for the Secure Call Alert setup messages to be sent on the traffic channel instead of a control channel. One reason for using the traffic channel to convey the setup messages is that such an implementation would enable the secure call alert feature on legacy cellular systems with little or no change to the existing FNE equipment since the traffic channel for private calls is usually transparent. There are various well-known techniques for sending data over the voice traffic channel such as robbed-bit signaling or the use of payload packets which are usually reserved for voice to carry data.

Further note that the exact sequence of messages described and illustrated in FIGS. 2 and 3 is intended as an example only since there can be changes in the sequence of messages to add or eliminate messages and still be within the intended scope and spirit of embodiments possible as recited in the appended claims herein. For example, one or more of the acknowledgement messages can be eliminated at the possible expense of reliability since the acknowledgements serve to synchronize the FNE and initiate the recipient devices or target MS units. Note, in FIG. 3, if the recipient device or MS is incapable of establishing a secure call or if a key exchange fails, then the MS can ignore the request or send a Secure Call Alert Paging Nak instead of a Secure Call Alert Paging Response.

Figure 4:
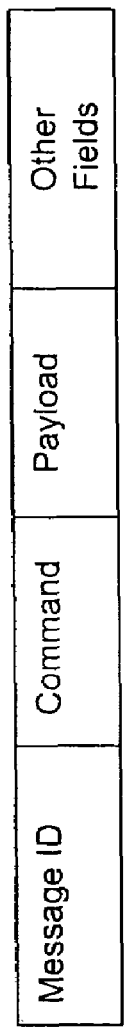
FIG. 4 is an example of a control message format in accordance with an embodiment of the present invention.

The actual format of the messages can vary and would typically match the format of messages used in the cellular system. For example, the cellular system might define a 4 byte message packet for communicating between the FNE and MS units, such as illustrated in FIG. 4 wherein a sample control message includes a Message ID field that contains a sequence number, a command field, a payload filed and other fields. In this example, a numeric value representing the message contents such as a Secure Call Alert Request can be sent in the Command field. The command field could also contain a request for a non-encrypted call alert request which would have a different numeric value. Using the command field in this manner, it is possible for the handset to initiate a request for either a secure or clear call alert. The message sequence and procedure for sending and acknowledging the call alert can remain the same with only the numeric values in the control message varying to communicate the request for a secure or clear alert.

Figure 5:
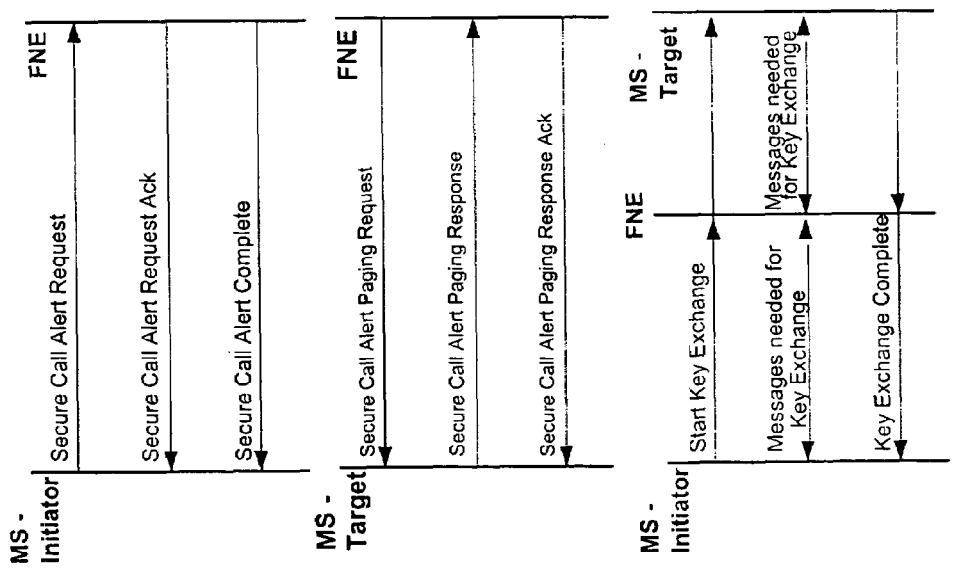
FIG. 5 is a secure call alert and key exchange process flow in accordance with an embodiment of the present invention.

In several embodiments, key exchange can be initiated automatically by a Secure Call Alert. As mentioned previously, secure calls typically require that a key exchange be performed to establish a symmetric key in both the alerting device and the recipient device. Since a Secure Call Alert is a request to start a secure call, automatic initiation of a key exchange, if required, would only speed the overall process. Referring to FIG. 5, a secure call alert and key exchange process flow is shown. In this example, the alerting and recipient devices (MS's) follow the same procedure described earlier for performing a Secure Call Alert. Next, the devices initiate a key exchange by sending messages back and forth via the FNE. The key exchange terminates with a Key Exchange Complete message. Since Key Exchange methods such as Diffie-Hellman and Elliptic Curve Cryptography are well known in the art, it is not necessary to detail these methods here. However, automatically initiating key exchange makes good use of any idle time that might exist between the time when the secure call alert is received by the recipient device and the user decides to respond back to the alerting device via the recipient device since users of recipient devices often do not necessarily respond back immediately to a call request due to being busy or unavailable. In any event, performing the key exchange process can take several seconds (or longer depending on the channel bandwidth). By performing the key exchange during the Secure Call Alert procedure, the secure voice call can often start sooner since the key exchange has been completed by the time the user of the recipient device is ready to respond back (securely). In cases where key exchange is not needed (because the phones discover that they already share a common key) the key exchange process can be skipped.

Figure 6:
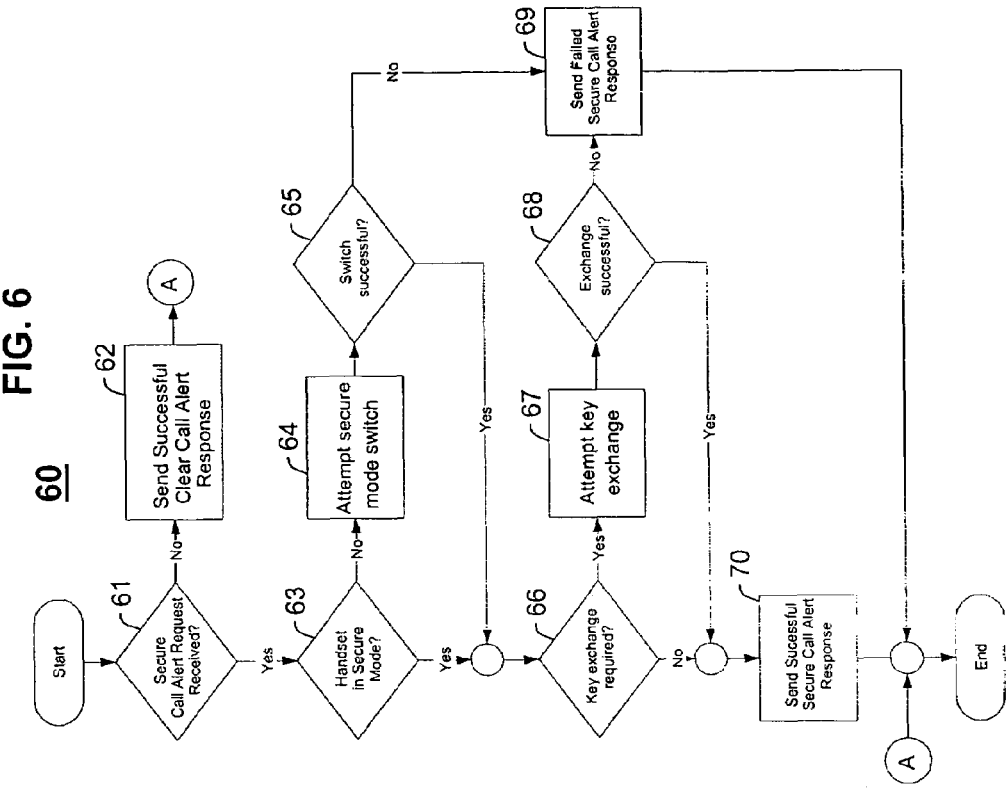
FIG. 6 is a flow chart illustrating a method of secure alert mode switching in accordance with an embodiment of the present invention.

Referring to FIG. 6, a flow chart demonstrating a method 60 or ability of a recipient device or target subscriber unit to switch between a clear mode and a secure modes depending on a type of Call Alert received. At decision block 61, if a secure call alert is not requested (a clear call alert is sent instead), then a successful clear call alert response is sent. Upon receipt of a Secure Call Alert at decision block 61, if the recipient device or target MS is not operating in secure mode at decision block 63, then the recipient device will try to switch to a secure mode at step 64. If the recipient device is not capable of switching at decision block 65, then it does not respond successfully to the FNE request and/or sends an error message such as a Secure Call Alert Nak at step 69. Conversely, if the unit is currently operating in secure mode at decision block 63 and requires no key exchange at decision block 66, then a Successful Call Alert response is sent at step 70. If a key exchange is required at decision block 66, then a key exchange attempt is done at step 67. If the key exchange is successful at decision block 68, then the Successful Call Alert response is sent at step 70. If the key exchange is unsuccessful at decision block 68, then the recipient device does not respond successfully to the FNE request and/or it sends an error message such as a Secure Call Alert Nak at step 69 before ending the process. Note, recipient devices that are only provisioned to work in one mode (either secure mode alone or clear mode alone), will only respond to Call Alert Requests that match the same type or mode. Further note, FIG. 6 illustrates the logic for switching from a clear mode to a secure mode, but similar logic can apply to the case where the recipient device is operating in secure mode and must switch to clear mode.

Figure 7:
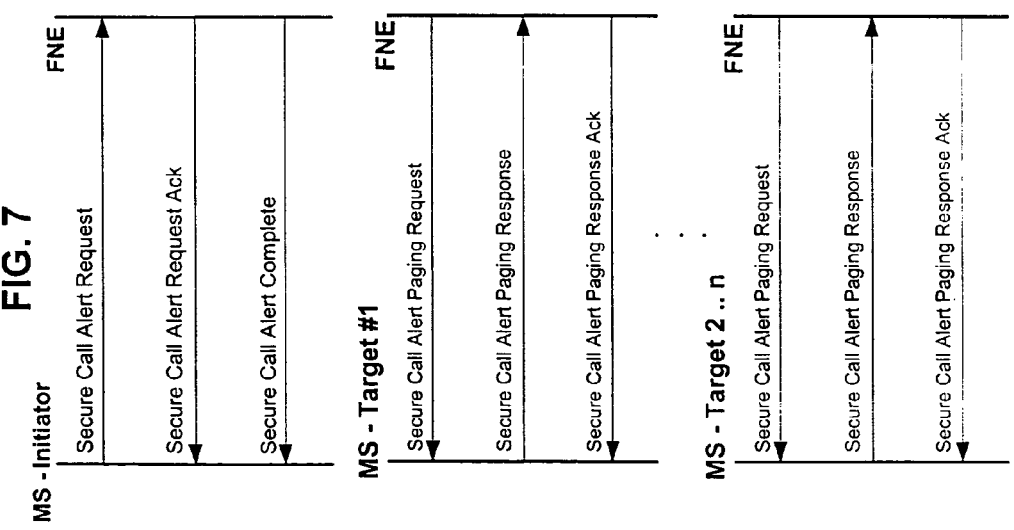
FIG. 7 is an example secure group call alert process flow in accordance with an embodiment of the present invention.

Secure call alerts can also be implemented for group calls which is an extension of private (or dispatch) call to 3 or more participants. Referring to FIG. 7, a process flow demonstrates how a secure call alert can be extended to perform a secure group call alert with three or more participants. Like a secure call alert for two parties, a secure group call can require that a common key be present on each MS or recipient that is a member of the group. Note that there are several ways to distribute a key securely to multiple recipient devices such as pre-placing a key on each recipient device either manually or with an external key loader or downloading keys over a secure link from a key server. It is also possible to exchange keys between multiple units using iterated Automatic Public Key exchange procedures where a master MS or recipient device contacts each target MS or recipient device in the group, performs an APK and sends a common key over an encrypted connection.

The process flow of FIG. 7 illustrates an embodiment where sending a secure group call alert can be accomplished by having the FNE contact each target in the group and sending a Secure Group Call Alert on behalf of the initiator. In essence, the procedure for sending a secure call alert to a group of recipient devices (MS's) can be the same as sending a secure private (or dispatch) call alert, with the exception that the origination procedure is performed once for each target MS. In an alternative embodiment, the FNE can broadcast a broadcast request to all the subscribers provisioned as members of a talkgroup or a predetermined list (that can possibly user selectable in some instances). Automatic key exchange can also be performed with each member of the group once the secure group call alert request has been received. Secure group call alerts can also be setup over the traffic channel.

Figure 8:
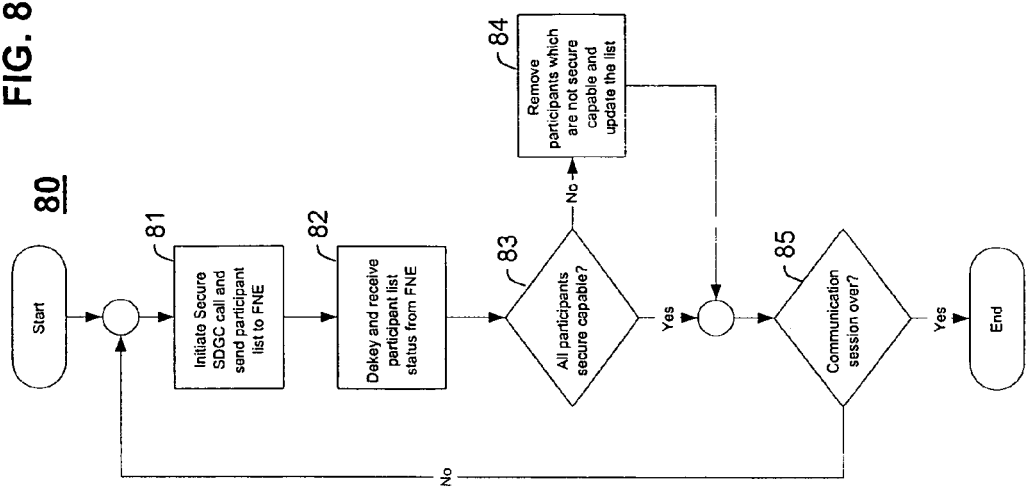
FIG. 8 is a flow chart illustrating a method of selective group call alerting in accordance with an embodiment of the present invention.

In yet another embodiment a method 80 of secure group calls as illustrated by the flow chart of FIG. 8 can be extended for Selective Dynamic Group Calls (SDGC) in a secure mode. Motorola's iDEN subscriber units can operate in an SDGC mode where the originating subscriber, upon starting a call, sends to the FNE a participant list of subscribers that it wants to include in a group call as shown at step 81. This list can be dynamic and can change from call to call. This way, the talk group participants do not have to be provisioned in the infrastructure a-priori. A secure group call can be extended to SDGC calls and can further have the FNE broadcast a status of all the recipient participants in the participant list which can be received at step 82. To avoid security holes, if the recipient device of a Secure SDGC call at decision block 83 determines that it is not capable of establishing a secure call, or if the key exchange fails, then at step 84, the particular recipient device from the participant list can be removed from the participant status message or be marked as not being secure so that subsequent communications do not attempt to include unsecure units. If All participants on the participant list are secure, then a secure group communication proceeds until a determination that the communication session is over at decision block 85. Note, FIG. 8 illustrates the subscriber logic for implementing secure SDGC, but similar logic can apply to the infrastructure which must update the participant status message based on the Secure Call Response or Secure Call Nak sent by the individual subscriber units in the group call.

In summary, a secure call alert feature can enable users to request a secure private session with a party in a similar manner to the way in which private call alerts work today (for clear communications). Furthermore, the user interface can uniquely indicate a secure alert so the caller is aware that sensitive information will be discussed or exchanged. Furthermore, the secure alert can initiate a key exchange to establish a common traffic key as is necessary for encrypted communication.

In light of the foregoing description, it should be recognized that embodiments in accordance with the present invention can be realized in hardware, software, or a combination of hardware and software. A network or system according to the present invention can be realized in a centralized fashion in one computer system or processor, or in a distributed fashion where different elements are spread across several interconnected computer systems or processors (such as a microprocessor and a DSP). Any kind of computer system, or other apparatus adapted for carrying out the functions described herein, is suited. A typical combination of hardware and software could be a general purpose computer system with a computer program that, when being loaded and executed, controls the computer system such that it carries out the functions described herein.

In light of the foregoing description, it should also be recognized that embodiments in accordance with the present invention can be realized in numerous configurations contemplated to be within the scope and spirit of the claims. Additionally, the description above is intended by way of example only and is not intended to limit the present invention in any way, except as set forth in the following claims.

What is claimed is:

1. A method of establishing secure wireless communications between encryption capable communication devices using a wireless secure call alert, comprising steps of:
    sending notification by an alerting device to a recipient device of the wireless secure call alert indicative of a desire for secure communications by activating a key on a user interface of the alerting device, wherein the alerting device and the recipient device are both cellular mobile devices;
    responsive to receipt of the notification, causing the recipient device to switch to a secure mode;
    initiating a key exchange between the alerting device and the recipient device if needed; and
    automatically responding to the wireless secure call alert by the recipient device in the secure mode when a user of the recipient device selectively responds to the secure call alert.

2. The method of claim 1, wherein the step of initiating the key exchange is achieved using Automatic Public Key exchange techniques, wherein the recipient device and the alerting device utilize existing crypto keys or new keys acquired during a background key exchange during an idle time occurring between receipt by the recipient device of the secure call alert and a user selected response to the secure call alert.

3. The method of claim 2, wherein the Automatic Public Key exchange is implemented using public-key algorithms selected from the group of Diffie-Hellman cryptography and Elliptic Curve Cryptography.

4. The method of claim 1, wherein the step of sending notification comprises the step of initiating the secure call alert by activating a key on a user interface on the alerting device using a control channel of a cellular system.

5. The method of claim 4, wherein the step of sending notification further comprises the step of activating a push-to-talk button on the alerting device.

6. The method of claim 1, wherein the step of sending notification comprises the step of sending a wireless secure call alert request to a base station.

7. The method of claim 6, wherein the method further comprises the step of receiving a wireless secure call alert acknowledgement from the base station signifying receipt of the wireless secure call request from the base station and the step of receiving a wireless secure call alert complete message signifying successful delivery of the wireless secure call request to the recipient device.

8. The method of claim 6, wherein the method further comprises the step of embedding a control message with the notification to enable the presentation of the notification of the secure call alert at the recipient device.

9. The method of claim 1, wherein the step of initiating the key exchanges occurs automatically in response to the wireless secure call alert sent by the alerting device.

10. The method of claim 1, wherein the method further comprises the step of sending notification of the wireless secure call alert to more than one recipient devices, wherein a wireless secure group call is established among the alerting device and the more than one recipient devices.

11. The method of claim 1, wherein the method further comprises the step of automatically switching at the recipient device between a secure mode and a clear mode depending on a type of wireless call alert received at the recipient device.

12. The method of claim 1, wherein the method further comprises the step of storing a predetermined number of symmetric traffic keys in a cache memory associated a predetermined number of other portable communication devices in recent communication with the alerting device.

13. An encryption capable communication device, comprising:
    a transceiver;
    a processor coupled to the transceiver, wherein the processor is programmed to:
        receive notification of a wireless secure call alert indicative of a desire for secure communications between an alerting device and the encryption capable communication device serving as a recipient device, wherein the alerting device and the recipient device are both cellular mobile devices and the wireless secure call alert is initiated by activating a key on a user interface of the alerting device;
        responsive to receipt of the notification, cause the recipient device to switch to a secure mode;
        initiate a key exchange between the alerting device and the recipient device if needed;
        automatically respond to the wireless secure call alert by the recipient device in the secure mode when a user of the recipient device selectively responds to the wireless secure call alert.

14. The encryption capable communication device of claim 13, wherein the processor is programmed to establish a symmetric traffic key during the key exchange using Automatic Public Key exchange techniques, wherein the recipient device and the alerting device utilize new keys acquired during a background key exchange during an idle time occurring between receipt by the recipient device of the secure call alert and a user selected response to the secure call alert.

15. The encryption capable communication device of claim 14, wherein the Automatic Public Key exchange is implemented using Future Narrow Band Digital Terminal protocol combined with public-key algorithms selected from the group of Diffie-Hellman cryptography and Elliptic Curve Cryptography.

16. The encryption capable communication device of claim 13, wherein the encryption capable communication device further comprises a display coupled to the processor and wherein the processor is further programmed to display the notification of the secure call alert upon receipt of the secure call alert.

17. A system for efficiently establishing secure communications using a wireless secure call alert, comprising:
- a first communication device communicatively coupled to a base station, wherein the first communication device serves as an alerting device programmed to user selectively send the wireless secure call alert to at least a second communication device by activating a key on a user interface of the alerting device;
- a recipient device such as the second communication device programmed to receive the wireless secure call alert and responsively exchange keys with the alerting device if needed for secure communication; and
- wherein the recipient device responds to the wireless secure call alert in a secure mode automatically when a user of the recipient device selectively, responds to the wireless secure call alert and wherein the alerting device and the recipient device are both cellular mobile devices.

18. The system of claim 17, wherein the alerting device sends the wireless secure call alert to the recipient device by sending a wireless secure call alert request to the base station which sends a wireless secure call alert paging request to the recipient device.

19. The system of claim 18, wherein the alerting device further receives a wireless secure call alert request acknowledgment upon the base station acknowledging receipt of the wireless secure call alert request and the alerting device further receives a wireless secure call alert complete message from base station indicating that the base station has successfully delivered the secure call request to the recipient device and that the recipient device acknowledged receipt.

20. The system of claim 17, wherein the alerting device can further establish a secure group call by sending a participant list to the base station whereupon the base station sends a wireless group call alert to members in the participant list.

* * * * *